(12) United States Patent
Tang et al.

(10) Patent No.: US 9,574,156 B2
(45) Date of Patent: Feb. 21, 2017

(54) LUBRICANT COMPOSITION

(71) Applicant: Afton Chemical Corporation, Richmond, VA (US)

(72) Inventors: Hong-Zhi Tang, Glen Allen, VA (US); Lee D. Saathoff, Glen Allen, VA (US)

(73) Assignee: Afton Chemical Corporation, Richmond, VA (US)

(*) Notice: Subject to any disclaimer, the term of this patent is extended or adjusted under 35 U.S.C. 154(b) by 0 days.

(21) Appl. No.: 14/101,917

(22) Filed: Dec. 10, 2013

(65) Prior Publication Data

US 2014/0097059 A1    Apr. 10, 2014

Related U.S. Application Data

(60) Provisional application No. 61/746,724, filed on Dec. 28, 2012, provisional application No. 61/746,732, filed on Dec. 28, 2012.

(51) Int. Cl.
| C10M 137/14 | (2006.01) |
| C10M 137/08 | (2006.01) |
| C10M 137/02 | (2006.01) |
| F16D 13/74 | (2006.01) |
| C10M 137/12 | (2006.01) |

(52) U.S. Cl.
CPC ......... *C10M 137/14* (2013.01); *C10M 137/02* (2013.01); *C10M 137/08* (2013.01); *C10M 137/12* (2013.01); *F16D 13/74* (2013.01); *C10M 2223/043* (2013.01); *C10M 2223/047* (2013.01); *C10M 2223/063* (2013.01); *C10M 2223/065* (2013.01); *C10N 2230/06* (2013.01); *C10N 2240/042* (2013.01)

(58) Field of Classification Search
CPC . C10M 137/14; C10M 137/12; C10M 137/02; C10M 137/08; C10M 2223/043; C10M 2223/047; C10M 2223/065; C10M 2223/063; F16D 13/74; C10N 2240/042; C10N 2230/06
USPC .......... 508/436, 438, 545, 547, 564
See application file for complete search history.

(56) References Cited

U.S. PATENT DOCUMENTS

| 3,793,199 A | 2/1974 | Schlicht |
| 4,252,662 A | 2/1981 | Marolewski et al. |
| 4,847,457 A | 7/1989 | Wirth et al. |
| 4,943,672 A | 7/1990 | Hamner et al. |
| 5,840,662 A | 11/1998 | Nibert et al. |
| 5,882,505 A | 3/1999 | Wittenbrink et al. |
| 5,891,786 A | 4/1999 | Srinivasan et al. |
| 6,013,171 A | 1/2000 | Cook et al. |
| 6,080,301 A | 6/2000 | Berlowitz et al. |
| 6,096,940 A | 8/2000 | Wittenbrink et al. |
| 6,103,099 A | 8/2000 | Wittenbrink et al. |
| 6,165,949 A | 12/2000 | Berlowitz et al. |
| 6,180,575 B1 | 1/2001 | Nipe |
| 7,410,935 B2 | 8/2008 | Hewette |
| 2010/0216675 A1* | 8/2010 | Habeeb .......... 508/279 |
| 2012/0277134 A1 | 11/2012 | Deshimaru |

FOREIGN PATENT DOCUMENTS

| CN | 102695784 A | 9/2012 |
| EP | 0713908 B1 | 5/1996 |
| EP | 0713901 B1 | 2/1998 |
| EP | 0721978 B1 | 8/1998 |

(Continued)

OTHER PUBLICATIONS

Notice of Reasons for Rejection; Mailed Mar. 4, 2015 for the corresponding JP Application No. 2013-271658.
Chinese Office Action; Mailed Apr. 27, 2015 for the corresponding CN Application No. CN201310743162.
European Search Report; Mailed Jul. 7, 2014 for EP Application No. EP13191831.0.
Japanese Notice of Reason for Rejection; Mailed Oct. 1, 2014 for JP Application No. JP2013-271658.
Korean Notice of Grounds for Rejection; Mailed Dec. 17, 2014 for KR Application No. KR2013-0164265.
Chinese Office Action; Mailed Mar. 10, 2016 for CN Application No. CN2013-10743162.

*Primary Examiner* — Taiwo Oladapo
(74) *Attorney, Agent, or Firm* — Mendelsohn Dunleavy, P.C.

(57) ABSTRACT

A lubricant composition comprising lubricating oil and a compound containing phosphorus and an amine of formula I:

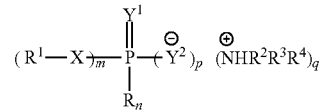

wherein $R^1$ is a hydrocarbon group and at least one of $R^1$ is selected from: $-(C_1-C_{20})$alkyl, $-(C_1-C_{20})$alkenyl, $-(C_5-C_{20})$cycloalkyl; R is selected from: $-(C_4-C_{20})$alkyl, $-(C_4-C_{20})$alkenyl, $-(C_5-C_{20})$cycloalkyl; and wherein $R^2$, $R^3$ and $R^4$ are independently selected from: $-H$, $-(C_6-C_{36})$alkyl, $-(C_6-C_{36})$alkenyl, $-(C_6-C_{36})$cycloalkyl, wherein at least one of $R^2$, $R^3$ and $R^4$ is not H; X is O or S; $Y^1$ and $Y^2$ are selected from S and O; m is 1 or 2, n is 0 or 1, p is 1 or 2, provided that m+n+p=3 and q=0.8 to 1.2*p, wherein the compound provides at least 48 ppm of phosphorus and a molar ratio phosphorus to nitrogen (P/N) in the range of about 0.40 to about 1.50.

26 Claims, No Drawings

(56) References Cited

FOREIGN PATENT DOCUMENTS

| EP | 0856042 B1 | 1/2003 |
|----|------------|--------|
| EP | 1840194 A1 | 10/2007 |
| EP | 2520640 A1 | 11/2012 |
| FR | 2986801 A1 | 8/2013 |
| JP | 60202892 A | 10/1985 |
| JP | 2004083751 A1 | 3/2004 |
| JP | 2007291357 A | 11/2007 |
| JP | 2012201807 A1 | 10/2012 |

* cited by examiner

LUBRICANT COMPOSITION

RELATED APPLICATIONS

This application claims priority to provisional application Ser. No. 61/746,724, filed Dec. 28, 2012, and to provisional application Ser. No. 61/746,732, filed Dec. 28, 2012.

TECHNICAL FIELD

The invention relates to a lubricant composition, in particular a lubricant composition used in a transmission fluid. Furthermore, the invention relates to a method for preparing a lubricant composition. Additionally, the invention relates to a use of the lubricant composition in a transmission. Moreover, the invention relates to a transmission comprising the lubricant composition.

BACKGROUND

One of the most important aspects in developing lubricant compositions for various applications is the individual adjustment and optimization of friction properties. Varying applications have differing demands on a lubricant. For example, a gear oil will require good extreme pressure and load-bearing properties, generally low boundary friction and low thin film friction is desired. On the other hand, a lubricant optimized for continuously variable transmissions (CVT) will require low boundary friction and high thin film friction. Clutches, in particular in automatic transmissions, require high boundary friction for an optimal torque transfer, whereas low thin film friction is generally desired to efficiently pump fluid through the transmission.

A particular focus of automatic transmission fluids (ATF) is the minimization of shudder (anti-shudder properties), which is believed to be a function of the change of friction coefficient with time ($d\mu/dt<0$). Furthermore, shift characteristics of automatic transmissions are primarily dependent on the frictional characteristics of the ATF. The fluid needs to have a very stable frictional performance over the life of the fluid. Generally, it is desired to design ATF lubricant compositions that maximize service intervals or even better, avoid oil service during the lifetime of the equipment. This is referred to in the industry as a lifetime fill or "fill-for-life" fluid. Therefore, maintenance of the friction properties of an ATF over time, i.e. ATF friction durability, is a highly desired property.

This is especially true in the field of power transmissions, in particular automatic transmissions, where an increasing demand for lubricant compositions with such improved friction properties exists. Accordingly, several approaches for providing a lubricating composition with improved friction performance are known. One approach is using high levels of amines as friction modifiers to improve the friction properties of a lubricant. The use of such amines at high levels has two problems. First the use of these amines will, because they are typically such effective friction reducers, drop the static friction performance of the ATF in a transmission to unacceptable levels causing the transmission to not be able to transmit torque effectively. Second, the use of high levels of amines often has a deleterious effect on the various polymeric seal materials, e.g., the seal material classed as GM DEXRON® IIIH Elastomers, e.g., V3 (VA-MAC), P2 (polyacrylate), N1 (nitrile), F1 (fluoroelastomer), etc., used in transmission hardware.

In EP 0 721 978 B1 a power transmission fluid composition comprising a hydrogenated poly-alpha-olefin oligomer fluid, an acrylic viscosity index improver, a dialkylester, an ashless dispersant, a friction modifier and an inhibitor is disclosed. Furthermore, EP 0 721 978 B1 suggests the use of amine phosphate as anti-wear extreme pressure agent in an amount of 0.05 wt.-%.

EP 0 713 908 B1 describes power transmission fluids having a Brookfield viscosity of 13,000 mPa s or less at −40° C. comprising at least 50 wt.-% of 55 N to 125 N hydro treated mineral oils, 5 to 40 wt.-% of hydrogenated poly-alpha-olefin oligomer, 5 to 20 wt.-% of acrylic viscosity index improver and other additives components. The compositions possess a combination of performance properties necessary for electronically controlled automatic transmissions equipped with torque converter clutches capable of operating in a continuous slip mode. Furthermore, EP 0 713 908 B1 suggests the use of amine phosphate as anti-wear extreme pressure agent in an amount of 0.02 to 0.05 wt.-%.

Again, two important friction properties of ATF compositions are friction durability and minimum static friction. EP 0 856 042 B9 describes two conventional ways to improve friction durability. One way is to increase the amount of friction modifier in the fluid which improves the friction durability, but, as discussed above, adversely affects, i.e. lowers, the friction coefficient of the fluid to undesirable levels, especially the static coefficient of friction. An alternative method is to improve the oxidation resistance of the fluid because it is generally believed that polar oxidation products compete with the friction modifiers for the friction surface. Nevertheless, reducing fluid oxidation for improving long term control of friction is difficult and hardly predictable. EP 0 856 042 B9 suggests to use a composition comprising a mixture of an antioxidant, a low potency friction modifier and an oil-soluble phosphorus containing compound, for improving the friction durability of an automatic transmission fluid.

DETAILED DESCRIPTION

One object of the invention is to provide a lubricant composition with further improved friction properties. Another object of the invention is to provide a lubricant composition which has improved friction durability. Yet another object of the invention is to provide a lubricant composition having a minimum static friction of at least 0.1.

The objects according to the present invention are solved by a lubricant composition as disclosed herein. The lubricant composition according to the invention comprises a mixture of a major amount of lubricating oil and a compound having a phosphorus containing species and an amine having the formula I:

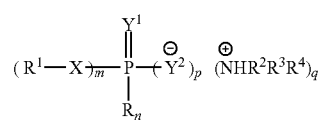

I or a solvate, hydrate, or proadditive thereof, wherein moietie(s) $R^1$ is/are hydrocarbon groups and at least one of $R^1$ is selected from the group consisting of: —$(C_1$-$C_{20})$alkyl, —$(C_1$-$C_{20})$alkenyl, —$(C_5$-$C_{20})$cycloalkyl; R is selected from the group consisting of: —$(C_4$-$C_{20})$alkyl, —$(C_4$-$C_{20})$alkenyl, —$(C_5$-$C_{20})$cycloalkyl; and wherein $R^2$, $R^3$ and $R^4$ are independently selected from the group consisting of: —H, —$(C_6$-$C_{36})$alkyl, —$(C_6$-$C_{36})$alkenyl, —$(C_6$-$C_{36})$cycloalkyl, wherein at least one of $R^2$, $R^3$ and $R^4$ is not H; X is O or S; $Y^1$ and $Y^2$ are independently selected from S and O; m is 1 or 2, n is 0 or 1, p is 1 or 2, with the proviso that m+n+p=3 and q=0.8 to 1.2*p (0.8 to 1.2 times the value of p), wherein the compound of formula I provides at least 48 ppm of phosphorus based on the total weight of the lubricant composition and wherein the compound of formula I provides a molar ratio phosphorus to nitrogen (P/N) in the range of about 0.40:1 to about 1.50:1. Lubricating compositions containing a compound of formula I are useful for improving friction durability and/or maintaining a minimum static friction of about 0.1.

In the expression $R_n$, n defines the number of R residues present (0 or 1).

The inventors have surprisingly found that the use of a compound having a phosphorus containing species and an amine as shown in formula I, characterized by a suitable P/N ratio at high treat rates that exceed conventional treat rates of an anti-wear compound, provides superior friction durability to the lubricant. Thereby the lubricant compositions of the invention may advantageously serve as lifetime or fill-for-life transmission lubricants or no-service transmission lubricants, in particular in an automatic transmission as described below. The inventors furthermore discovered that lubricant compositions of the invention may have the additional surprising advantage of exhibiting a high static friction, suitable to improve torque transfer properties even without additional friction modifier additives.

In one embodiment $R^1$ may not be —($C_4$-$C_5$)alkyl if both $Y^1$ and $Y^2$ are O. The compound of formula I may be undersalted for q<p and oversalted for q>p.

In another embodiment the degree of salting as expressed by the value of index p (the acid valency) in Formula I may be from 0.85 to 1.15 times the value of q (the relative molar amount of amine), or in another embodiment from 0.90 to 1.10. If p equals q, one would speak of a stoichiometrically, or "neutral" amine salted acid phosphate.

The lubricant composition may further comprise one or more components selected from the group consisting of de-foamants, detergents, viscosity index improvers, dispersants, anti-corrosion agents, extreme pressure agents, friction modifiers, and anti-foam agents.

In one embodiment the lubricant composition may comprise one or more friction modifiers selected from the group consisting of borated fatty epoxides, fatty epoxides, borated alkoxylated fatty amines, alkoxylated fatty amines, fatty amines, borated glycerol esters, polyol or glycerol esters, metal salts of fatty acids, fatty acid amides, fatty imidazolines, condensation products of carboxylic acids and polyalkylene-polyamines, sulfurized olefins, amine salts of partial esters of phosphoric acids, dialkyl phosphites, metal salts of alkyl salicylates, esters of long chain alkyl phosphonates, long chain amino ethers and alkyoxylated versions thereof, long chain alkyoxylated alcohol, organo molybdenum compounds, or mixtures thereof.

One class of friction modifiers may include succinimides, amines, secondary amines, tertiary amines, imidazolines and borated epoxides. Another class of friction modifiers may include borated glycerol esters, polyol or glycerol esters, metal salts of fatty acids, fatty acid amides, sulfurized olefins, dialkyl phosphites, metal salts of alkyl salicylate, esters of long chain alkylphosphonates, long chain alkyoxylated alcohols and organo molybdenum compounds.

Another embodiment of the disclosure provides an automatic transmission comprising at least three wet-clutch friction disk and a lubricant composition comprising a mixture of:
(a) a major amount of lubricating oil; and
(b) a compound having a phosphorus containing species and an amine having the formula I:

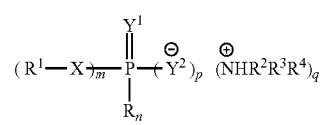

or a solvate, hydrate, or proadditive thereof,
wherein moietie(s) R1 is/are hydrocarbon groups and at least one of R1 is selected from the group consisting of: —(C1-C20)alkyl, —(C1-C20)alkenyl, —(C5-C20)cycloalkyl; R is selected from the group consisting of: —(C4-C20)alkyl, —(C4-C20)alkenyl, —(C5-C20)cycloalkyl; and wherein R2, R3 and R4 are independently selected from the group consisting of: —H, —(C6-C36)alkyl, —(C6-C36)alkenyl, —(C6-C36)cycloalkyl, wherein at least one of R2, R3 and R4 is not H; X is O or S; Y1 and Y2 are independently selected from S and O; m is 1 or 2, n is 0 or 1, p is 1 or 2, with the proviso that m+n+p=3 and q=0.8 to 1.2*p,
wherein the compound of formula I provides at least 48 ppm of phosphorus based on the total weight of the lubricant composition and wherein the compound of formula I provides a molar ratio phosphorus to nitrogen (P/N) in the range of from about 0.40 to about 1.50.

Lubricating Base Oil

A lubricating oil is a base oil(s) suitable for use in formulating lubricant compositions, lubricating fluids, or transmission fluids according to the disclosure may be selected from any of suitable synthetic or natural oils or mixtures thereof having a suitable lubricating viscosity. Natural oils may include animal oils and vegetable oils (e.g., castor oil, lard oil) as well as mineral lubricating oils such as liquid petroleum oils and solvent treated or acid-treated mineral lubricating oils of the paraffinic, naphthenic or mixed paraffinic-naphthenic types. Oils derived from coal or shale may also be suitable. The base oil typically may have a viscosity of about 2 to about 15 cSt or, as a further example, about 2 to about 10 cSt at 100° C. Further, an oil derived from a gas-to-liquid process is also suitable.

Suitable synthetic base oils may include alkyl esters of dicarboxylic acids, polyglycols and alcohols, poly-alpha-olefins, including polybutenes, alkyl benzenes, organic esters of phosphoric acids, and polysilicone oils. Synthetic oils include hydrocarbon oils such as polymerized and interpolymerized olefins (e.g., polybutylenes, polypropylenes, propylene isobutylene copolymers, etc.); poly(1-hexenes), poly-(1-octenes), poly(1-decenes), etc. and mixtures thereof; alkylbenzenes (e.g., dodecylbenzenes, tetradecylbenzenes, di-nonylbenzenes, di-(2-ethylhexyl)benzenes, etc.); polyphenyls (e.g., biphenyls, terphenyl, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic oils that may be used. Such oils are exemplified by the oils prepared through polymerization of ethylene oxide or propylene oxide, the alkyl and aryl ethers of these polyoxyalkylene polymers (e.g., methylpolyisopropylene glycol ether having an average molecular weight of about 1000, diphenyl ether of polyethylene glycol having a molecular weight of about 500-1000, diethyl ether of polypropylene glycol having a molecular weight of about 1000-1500, etc.) or mono- and polycarboxylic esters thereof, for example, the acetic acid esters, mixed $C_3$-$C_8$ fatty acid esters, or the $C_{13}$ oxo-acid diester of tetraethylene glycol.

Another class of synthetic oils that may be used includes the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Hence, the base oil used which may be used to make the lubricant compositions as described herein may be a single base oil or may be a mixture of two or more base oils. In particular, the one or more base oil(s) may desirably be selected from any of the base oils in Groups I-V as specified in the American Petroleum Institute (API) Base Oil Interchangeability Guidelines. Such base oil groups are as follows:

TABLE 1

| Base Oil Group[1] | Sulfur (wt %) | | Saturates (wt %) | Viscosity Index |
|---|---|---|---|---|
| Group I | >0.03 | And/or | <90 | 80 to 120 |
| Group II | ≤0.03 | And | ≥90 | 80 to 120 |
| Group III | ≤0.03 | And | ≥90 | ≥120 |
| Group IV | all polyalphaolefins (PAOs) | | | |
| Group V | all others not included in Groups I-IV | | | |

[1]Groups I-III are mineral oil base stocks.

The base oil may contain a minor or major amount of a poly-alpha-olefin (PAO). Typically, the poly-alpha-olefins are derived from monomers having from about 4 to about 30, or from about 4 to about 20, or from about 6 to about 16 carbon atoms. Examples of useful PAOs include those derived from octene, decene, mixtures thereof, and the like. PAOs may have a viscosity of from about 2 to about 15, or from about 3 to about 12, or from about 4 to about 8 cSt at 100° C. Examples of PAOs include 4 cSt at 100° C. poly-alpha-olefins, 6 cSt at 100° C. poly-alpha-olefins, and mixtures thereof. Mixtures of mineral oil with the foregoing poly-alpha-olefins may be used.

The base oil may be an oil derived from Fischer-Tropsch synthesized hydrocarbons. Fischer-Tropsch synthesized hydrocarbons are made from synthesis gas containing $H_2$ and CO using a Fischer-Tropsch catalyst. Such hydrocarbons typically require further processing in order to be useful as the base oil. For example, the hydrocarbons may be hydroisomerized using processes disclosed in U.S. Pat. No. 6,103,099 or 6,180,575; hydrocracked and hydroisomerized using processes disclosed in U.S. Pat. No. 4,943,672 or 6,096,940; dewaxed using processes disclosed in U.S. Pat. No. 5,882,505; or hydroisomerized and dewaxed using processes disclosed in U.S. Pat. Nos. 6,013,171; 6,080,301; or 6,165,949.

Unrefined, refined, and rerefined oils, either natural or synthetic (as well as mixtures of two or more of any of these) of the type disclosed hereinabove can be used in the base oils. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives, contaminants, and oil breakdown products.

The base oil may be combined with an additive composition as disclosed in embodiments herein to provide transmission fluids. Accordingly, the base oil may be present in the fluid composition described herein in a major amount such as an amount ranging from more than about 30 wt. % to about 95 wt. %, for example, from about 40 wt % to about 90 wt. %, and typically more than about 50 wt. % based on a total weight of the fluid composition.

In one embodiment the lubricant composition is free of vegetable oil, synthetic triglyceride oil, polyglycerol fatty acid esters, thiophosphoric acid esters, triazole-containing species, phosphite antioxidants, polyalkylene glycols, ZDDP, triglycerides or polyether polyols.

In an advantageous embodiment the lubricant composition may have a friction durability greater than about 8,500, or in another embodiment greater than about 10,000, or in yet another embodiment greater than about 20,000 cycles using the amended JASO M348:2002 test method where the µ0/µd value is maintained at less than about 1.1, and/or a minimum static friction of about 0.1 is maintained.

In one embodiment the compound of formula I may provide at least about 50, or in another embodiment at least about 100, or in another embodiment at least about 200, or in yet another embodiment at least about 300, or in yet another embodiment at least about 400, and still in another embodiment at least about 1,000 ppm of phosphorus based on the total weight of the lubricant composition. In another embodiment the compound of formula I may provide at least about 2,000, in yet another embodiment at least about 2,500, and in still another embodiment at least about 3,000, and in another embodiment at least about 4,000 ppm of phosphorus based on the total weight of the lubricant composition.

The compound of formula I may generally provide less than about 10,000, and in another embodiment less than about 8,000, and in still another embodiment less than about 5,000 ppm of phosphorus based on the total weight of the lubricant composition. The treat rate of the compound of formula I may be at least about 0.1, and in another embodiment at least about 1, and still in another embodiment at least about 2, and in yet another embodiment at least about 5 wt.-% based on the total weight of the lubricant compositions. In another embodiment the treat rate of the compound of formula I may be from about 1.5 to about 15, and in another embodiment from about 2.5 to about 13, and in still another embodiment from about 3 to about 12.5, and in yet another embodiment from about 3.5 to about 12 wt.-% based on the total amount of the lubricant composition. By the above embodiments, the friction durability and/or the minimum static friction of the lubricant composition may be further improved.

The lubricant composition may be used in a transmission comprising a wet-clutch friction disk in order to improve the friction durability of a transmission fluid.

The transmission according to the invention comprises a wet-clutch friction disk and the lubricant composition. In one embodiment the transmission may be an automatic transmission. In another embodiment the transmission may comprise at least three wet-clutch friction disks. In yet another embodiment the wet-clutch friction disk may have a total intrusion volume of about 0.04 to about 0.1 ml/g of the sample (samples are made by cutting the friction material while it is attached to a standard (according to JASO M348:2002) steel JASO plate, so the sample includes both the friction material and the steel JASO plate. Two cuts are made so that a gap in the friction disk occurs. The size of the sample is bound only by the dimensions of the porosimeter used to measure the sample, would skilled in the art will be able to make samples of proper size. Any mention of friction disk sample within the specification will have a similar meaning unless explicitly defined differently) and/or a pore diameter of maximum value of dV/dlogP measured in the range between about 0.1 and about 80 μm of about 6 to about 12 μm and/or a median diameter in the range of about 2 to about 20 μm. In still another embodiment the wet-clutch friction disk may have a total intrusion volume of about 0.06 to about 0.1 ml/g of the sample and/or a pore diameter of maximum value of dV/dlogP measured in the range between about 0.1 and about 80 μm of about 7 to about 10 μm and/or a median diameter in the range of about 5 to about 15 μm. The total intrusion volume and the pore diameter may be determined via mercury porosimetry. Each embodiment of the transmission may comprise a lubricant composition comprising any embodiment of the compound of formula I.

In one embodiment of the lubricant composition, the compound having a phosphorus containing species and an amine may have the formula II:

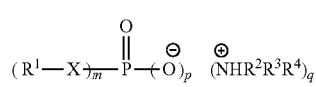

or a solvate, hydrate, or proadditive thereof, wherein moietie(s) $R^1$ is/are hydrocarbon group(s) and at least one of $R^1$ is selected from the group consisting of: linear —$(C_6$-$C_{20})$alkyl, —$(C_6$-$C_{20})$alkenyl, —$(C_6$-$C_{20})$cycloalkyl; and wherein $R^2$, $R^3$ and $R^4$ are independently selected from the group consisting of: —H, —$(C_6$-$C_{36})$alkyl, —$(C_6$-$C_{36})$alkenyl, —$(C_6$-$C_{36})$cycloalkyl, wherein at least one of $R^2$, $R^3$ and $R^4$ is not H; X is O or S; m is 1 or 2; p is 1 or 2, with the proviso that m+p=3 and q=0.8 to 1.2*p.

At least one, and in some embodiments at least two of $R^2$, $R^3$ and $R^4$ of the compound of formula II may be branched. A branched group is one having at least one secondary or tertiary carbon. In yet another embodiment $R^2$, $R^3$ and $R^4$ is a branched —$(C_{11}$-$C_{14})$ alkyl Amines having branched alkyl groups may be useful in providing a minimum static friction of about 0.1. In another embodiment, at least one of moietie(s) $R^1$ of the compound of formula II may not be branched. Phosphorus containing species having linear alkyl groups may be useful for providing improved friction durability.

In one embodiment at least one of $R^1$ of the compound of formula II may be a linear alkyl, in another embodiment $R^1$ may be a linear —$(C_6$-$C_{18})$ alkyl. In another embodiment at least one of $R^1$ may be n-hexyl. In another embodiment at least one of $R^1$ may be n-oleyl. These embodiments are useful for improving the friction durability and/or the minimum static friction of the lubricant composition.

In one embodiment $R^2$, $R^3$ and $R^4$ of the compound of formula II may be independently selected from the group consisting of: —H, linear —$(C_{10}$-$C_{19})$ alkyl, branched —$(C_6$-$C_{15})$ alkyl, —$(C_6$-$C_{20})$ alkenyl, —$(C_6$-$C_{20})$ cycloalkyl. In another embodiment $R^2$, $R^3$ and $R^4$ may be independently selected from the group consisting of —H, linear —$(C_8$-$C_{18})$ alkyl, branched —$(C_8$-$C_{14})$ alkyl, —$(C_8$-$C_{18})$ alkenyl, —$(C_8$-$C_{18})$ cycloalkyl. In yet another embodiment $R^2$, $R^3$ and $R^4$ are independently selected from the group consisting of —H, n-oleyl, 2-ethylhexyl, branched —$(C_{11}$-$C_{14})$ alkyl. By the above embodiments the friction durability and/or the minimum static friction of the lubricant composition may be further improved.

The compound of formula II may provide a molar ratio of phosphorus to nitrogen (P/N) of about 0.50 to about 0.9, and in another embodiment from about 0.52 to about 0.88. In one embodiment the compound of formula II may provide a molar ratio of phosphorus to nitrogen (P/N) of about 0.61 to about 0.86. Accordingly, the friction durability and/or the minimum static friction of the lubricant composition may be further improved.

The compound of formula II may provide at least about 50, and in another embodiment at least about 100, and in still another embodiment at least about 200, and in another embodiment at least about 300, and in yet another embodiment at least about 400, and in still another embodiment at least about 1,000 ppm of phosphorus based on the total weight of the lubricant composition. In one embodiment the compound of formula II may provide at least about 2,000, and in another embodiment at least about 2,500, and in yet another embodiment at least about 3,000, and in still another embodiment at least about 4,000 ppm of phosphorus based on the total weight of the lubricant composition.

The compound of formula II may provide less than about 10,000, and in another embodiment less than about 8,000, and in yet another embodiment less than about 5,000 ppm of phosphorus based on the total weight of the lubricant composition. The treat rate of the compound of formula II may be at least about 0.1, and in another embodiment at least about 1, and in yet another embodiment at least about 2 or at least about 2.5, and in still another embodiment at least about 5 wt.-% based on the total weight of the lubricant compositions. In another embodiment the treat rate of the compound of formula II may be from about 1.5 to about 15, in another embodiment from about 2.5 to about 13, and in yet another embodiment from about 3 to about 12.5, and in still another embodiment from about 3.5 to about 12 wt.-% based on the total amount of the lubricant composition. By the above embodiments, the friction durability and/or the minimum static friction of the lubricant composition may be further improved.

The transmission according to the invention comprises a wet-clutch friction disk and the lubricant composition. In one embodiment the transmission may be an automatic transmission. In another embodiment the transmission may comprise at least three wet-clutch friction disks. In yet another embodiment the wet-clutch friction disk may have a total intrusion volume of about 0.04 to about 0.1 ml/g of the sample and/or a pore diameter of maximum value of dV/dlogP measured in the range between about 0.1 and about 80 μm of about 6 to about 12 μm and/or a median diameter in the range of about 2 to about 20 μm. In still another embodiment the wet-clutch friction disk may have a total intrusion volume of about 0.06 to about 0.1 ml/g of the sample and/or a pore diameter of maximum value of dV/dlogP measured in the range between about 0.1 and about 80 μm of about 7 to about 10 μm and/or a median diameter in the range of about 5 to 15 about μm. The total intrusion volume and the pore diameter may be determined via mercury porosimetry. Each embodiment of the transmission may comprise a lubricant composition comprising any embodiment of the compound of formula II.

In another embodiment of the lubricant composition, the compound having a phosphorus containing species and an amine may have the formula III:

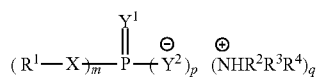

III or a solvate, hydrate, or proadditive thereof, wherein moietie(s) $R^1$ is/are hydrocarbon group(s) and at least one of $R^1$ is selected from the group consisting of: $-(C_4-C_{20})$alkyl, $-(C_4-C_{20})$alkenyl, $-(C_5-C_{20})$cycloalkyl; and wherein $R^2$, $R^3$ and $R^4$ are independently selected from the group consisting of: $-H$, $-(C_6-C_{36})$alkyl, $-(C_6-C_{36})$alkenyl, $-(C_6-C_{36})$cycloalkyl; $Y^1$ and $Y^2$ are different and selected from S and O; X is O or S; m is 1 or 2, p is 1 or 2, with the proviso that m+p=3 and q=0.8 to 1.2*p.

The compound of formula III may provide a molar ratio of phosphorus to nitrogen (P/N) of about 0.8 to about 1.5, or in another embodiment from about 0.85 to about 1.30. Lubricant compositions containing a compound of formula III may be useful to improve friction durability.

In one embodiment at least one of $R^1$ of the compound of formula III may be a linear alkyl, in particular a linear $-(C_4-C_{18})$ alkyl. In another embodiment at least one of $R^1$ may be n-butyl.

In one embodiment $R^2$, $R^3$ and $R^4$ of the compound of formula III may be independently selected from the group consisting of: $-H$, $-(C_8-C_{18})$ alkyl, $-(C_8-C_{18})$ alkenyl, $-(C_8-C_{18})$ cycloalkyl. In another embodiment $R^3$ and $R^4$ are $-H$, and $R^2$ is a $-(C_4-C_9)$ alkyl, or $-(C_{15}-C_{20})$ alkyl, or a mixture of both. In yet another embodiment $R^2$ may be n-octyl, n-olyl or a mixture of both.

The compound of formula III may provide at least about 100, and in another embodiment at least about 400, and in yet another embodiment at least about 800, and in still another embodiment at least about 1,000 ppm of phosphorus based on the total weight of the lubricant composition. In one embodiment the compound of formula III may provide at least about 2,000, and in another embodiment at least about 2,500, and yet in another embodiment at least about 3,000, and in still another embodiment at least about 4,000 ppm of phosphorus based on the total weight of the lubricant composition.

The compound of formula III may provide less than about 10,000, and in another embodiment less than about 8,000, and in another embodiment less than about 5,000 ppm of phosphorus based on the total weight of the lubricant composition. The treat rate of the compound of formula III may be at least about 0.1, and in another embodiment at least about 1, and in yet another embodiment at least about 2, and in still another embodiment at least about 5 wt.-% based on the total weight of the lubricant compositions. In another embodiment the treat rate of the compound of formula III may be from about 1.5 to about 15, and in another embodiment from about 2.5 to about 13, and in yet another embodiment from about 3 to about 12.5, and in still another embodiment from about 3.5 to about 12 wt.-% based on the total amount of the lubricant composition. By the above embodiments, the friction durability and/or the minimum static friction of the lubricant composition may be further improved.

The transmission according to the invention comprises a wet-clutch friction disk and the lubricant composition. In one embodiment the transmission may be an automatic transmission. In another embodiment the transmission may comprise at least three wet-clutch friction disks. In yet another embodiment the wet-clutch friction disk may have a total intrusion volume of about 0.04 to about 0.1 ml/g of the sample and/or a pore diameter of maximum value of dV/dlogP measured in the range between about 0.1 and about 80 μm of about 6 to about 12 μm and/or a median diameter in the range of about 2 to about 20 μm. In still another embodiment the wet-clutch friction disk may have a total intrusion volume of about 0.06 to about 0.1 ml/g of the sample and/or a pore diameter of maximum value of dV/dlogP measured in the range between about 0.1 and about 80 μm of about 7 to about 10 μm and/or a median diameter in the range of about 5 to about 15 μm. The total intrusion volume and the pore diameter may be determined via mercury porosimetry. Each embodiment of the transmission may comprise a lubricant composition comprising any embodiment of the compound of formula III.

In another embodiment of the lubricant composition, the compound having a phosphorus containing species and an amine may have the formula IV:

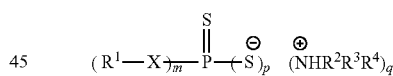

IV or a solvate, hydrate, or proadditive thereof, wherein moietie(s) $R_1$ is/are hydrocarbon group(s) and at least one of $R^1$ is selected from the group consisting of: $-(C_4-C_{20})$alkyl, $-(C_4-C_{20})$alkenyl, $-(C_5-C_{20})$cycloalkyl; and wherein $R^2$, $R^3$ and $R^4$ are independently selected from the group consisting of: $-H$, $-(C_6-C_{36})$alkyl, $-(C_6-C_{36})$alkenyl, $-(C_6-C_{36})$cycloalkyl, $-(C_6-C_{36})$cycloalkyl; X is O or S; m is 1 or 2, p is 1 or 2, with the proviso that m+p=3 and q=0.8 to 1.2*p.

The compound of formula IV may provide a molar ratio phosphorus to nitrogen (P/N) of about 0.8 to about 1.5, and in another embodiment about 0.85 to about 1.30. Lubricant compositions containing a compound of formula IV may be useful to improve friction durability.

In one embodiment at least one of $R^1$ of the compound of formula IV may be a $-(C6-C10)$ alkyl. In another embodiment at least one of $R^1$ may be 2-ethylhexyl or n-hexyl.

In one embodiment $R^2$, $R^3$ and $R^4$ of the compound of formula IV may be independently selected from the group consisting of: $-H$, $-(C_8-C_{18})$alkyl, $-(C_8-C_{18})$alkenyl, —($C_8$-$C_{18}$) cycloalkyl. In another embodiment $R^3$ and $R^4$ may be —H, and $R^2$ may be a —($C_{11}$-$C_{14}$)alkyl, in particular a branched —($C_{11}$-$C_{14}$)alkyl.

The compound of formula IV may provide at least about 300, and in another embodiment at least about 1,000, and in another embodiment at least about 2,000, and in yet another embodiment at least about 3,000 ppm of phosphorus based on the total weight of the lubricant composition. In one embodiment the compound of formula IV may provide at least about 4,000, and in another embodiment at least about 5,000, in yet another embodiment at least about 6,000, and in still another embodiment at least about 7,000 ppm of phosphorus based on the total weight of the lubricant composition.

The compound of formula IV may provide less than about 15,000, and in another embodiment less than about 10,000, and in yet another embodiment less than about 9,000 ppm of phosphorus based on the total weight of the lubricant composition. The treat rate of the compound of formula IV may be at least about 2, and in another embodiment at least about 5, and in yet another embodiment at least about 8, and in still another embodiment at least about 10 wt.-% based on the total weight of the lubricant compositions. In another embodiment the treat rate of the compound of formula IV may be from about 3 to about 20, and in another embodiment from about 7 to about 18, and in yet another embodiment from about 9 to about 15 based on the total amount of the lubricant composition. By the above embodiments the friction durability and/or the minimum static friction of the lubricant composition may be further improved.

The transmission according to the invention comprises a wet-clutch friction disk and the lubricant composition. In one embodiment the transmission may be an automatic transmission. In another embodiment the transmission may comprise at least three wet-clutch friction disks. In yet another embodiment the wet-clutch friction disk may have a total intrusion volume of about 0.04 to about 0.1 ml/g of the sample and/or a pore diameter of maximum value of dV/dlogP measured in the range between about 0.1 and 80 μm of about 6 to about 12 μm and/or a median diameter in the range of about 2 to about 20 μm. In still another embodiment the wet-clutch friction disk may have a total intrusion volume of about 0.06 to about 0.1 ml/g of the sample and/or a pore diameter of maximum value of dV/dlogP measured in the range between about 0.1 and about 80 μm of about 7 to about 10 μm and/or a median diameter in the range of about 5 to about 15 μm. The total intrusion volume and the pore diameter may be determined via mercury porosimetry. Each embodiment of the transmission may comprise a lubricant composition comprising any embodiment of the compound of formula IV.

In another embodiment of the lubricant composition the compound having a phosphorus containing species and an amine may have the formula V:

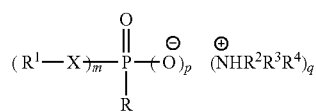

wherein $R^1$ is selected from the group consisting of: —($C_1$-$C_{20}$)alkyl, —($C_1$-$C_{20}$)alkenyl, —($C_5$-$C_{20}$)cycloalkyl; R is selected from the group consisting of: —($C_4$-$C_{20}$)alkyl, —($C_4$-$C_{20}$)alkenyl, —($C_5$-$C_{20}$)cycloalkyl; and wherein $R^2$, $R^3$ and $R^4$ are independently selected from the group consisting of: —H, —($C_6$-$C_{36}$)alkyl, —($C_6$-$C_{36}$)alkenyl, —($C_6$-$C_{36}$)cycloalkyl, wherein at least one of $R^2$, $R^3$ and $R^4$ is not H; X is O or S; m is 1, p is 1 and q=0.8 to 1.2*p.

The compound of formula V may provide a molar ratio of phosphorus to nitrogen (P/N) of about 0.5 to about 1.5, or in another embodiment from about 0.7 to about 1.30. Lubricant compositions containing a compound of formula V may be useful to improve friction durability.

In one embodiment $R^1$ of the compound of formula V may be a —($C_6$-$C_{20}$) alkyl. In another embodiment $R^1$ may be octadecyl.

In one embodiment $R^2$, $R^3$ and $R^4$ of the compound of formula V may be independently selected from the group consisting of: —H, —($C_1$-$C_{15}$)alkyl, —($C_1$-$C_{15}$)alkenyl, —($C_5$-$C_{15}$) cycloalkyl. In another embodiment $R^2$ may be methyl, $R^3$ may be a —($C_{11}$-$C_{14}$)alkyl, in particular a branched —($C_{11}$-$C_{14}$)alkyl and $R^4$ may be —H.

The compound of formula V may provide at least about 50, and in another embodiment at least about 100, and in yet another embodiment at least about 200, and in still another embodiment at least about 300 ppm of phosphorus based on the total weight of the lubricant composition. In one embodiment the compound of formula V may provide at least about 500, and in another embodiment at least about 600, and in yet another embodiment at least about 700, and in still another embodiment at least about 1,000 ppm of phosphorus based on the total weight of the lubricant composition.

The compound of formula V may provide less than about 10,000, and in another embodiment less than about 8,000, and in yet another embodiment less than about 5,000 ppm of phosphorus based on the total weight of the lubricant composition. The treat rate of the compound of formula V may be at least about 0.1, and in another embodiment at least about 0.2, and in another embodiment at least about 0.5, and in yet another embodiment at least about 2 wt.-% based on the total weight of the lubricant compositions. In another embodiment the treat rate of the compound of formula V may be from about 0.05 to about 15, and in another embodiment from about 0.3 to about 13, and in yet another embodiment from about 0.5 to about 12.5, and in still another embodiment from about 1 to about 12 wt.-% based on the total amount of the lubricant composition. By the above embodiments the friction durability and/or the minimum static friction of the lubricant composition may be further improved.

The transmission according to the invention comprises a wet-clutch friction disk and the lubricant composition. In one embodiment the transmission may be an automatic transmission. In another embodiment the transmission may comprise at least three wet-clutch friction disks. In yet another embodiment the wet-clutch friction disk may have a total intrusion volume of about 0.04 to about 0.1 ml/g of the sample and/or a pore diameter of maximum value of dV/dlogP measured in the range between about 0.1 and about 80 μm of about 6 to about 12 μm and/or a median diameter in the range of about 2 to about 20 μm. In still another embodiment the wet-clutch friction disk may have a total intrusion volume of about 0.06 to about 0.1 ml/g of the sample and/or a pore diameter of maximum value of dV/dlogP measured in the range between about 0.1 and 80 μm of about 7 to about 10 μm and/or a median diameter in the range of about 5 to about 15 μm. The total intrusion volume and the pore diameter may be determined via mercury porosimetry. Each embodiment of the transmission may comprise a lubricant composition comprising any embodiment of the compound of formula V.

In another embodiment, in the amine of formulas I, II, III, IV, and V, one or more of $R^2$, $R^3$ and $R^4$ may be made by a process of oligomerizing a $C_2$-$C_6$ olefin, in particular the amine may be made by oligomerizing a $C_2$-$C_6$ olefin to provide at least one, and in another embodiment at least two of $R_2$, $R_3$ and $R_4$ by amination using HCN and water under acidic conditions or in another embodiment wherein the amine is made by oligomerizing a $C_2$-$C_6$ olefin to provide at least one of $R^2$, $R^3$ and $R^4$, followed by reacting CO and $H_2$ to generate an alcohol and reacting the alcohol with $NH_3$ to generate the amine.

In yet another embodiment, in the amine of formulas I, II, III, IV, and V, one or more of $R^2$, $R^3$ and $R^4$ is made by a process of oligomerizing a $C_2$-$C_6$ olefin, in particular wherein the amine

is made by a process comprising oligomerizing a $C_2$-$C_6$ olefin to provide at least one of $R^2$, $R^3$ and $R^4$ by amination using HCN and water under acidic conditions or alternatively the amine is made by oligomerizing a $C_2$-$C_6$ olefin to provide at least one of $R^2$, $R^3$ and $R^4$, followed by reacting CO and $H_2$ to generate an alcohol and reacting the alcohol with $NH_3$ to generate the amine. In the foregoing compound, the ratio of molar equivalents of amine to phosphorus containing species is from about 0.8 to about 1.2.

The invention also relates to a lubricant composition obtainable by the following process of the invention as well as to the following process for preparing a lubricant composition.

The process according to the invention for preparing a lubricant composition comprises mixing a major amount of lubricating oil and a reaction product prepared by a process comprising the steps of:

(i) providing at least one phosphorus containing species having the formula VII:

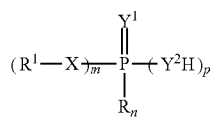

VII or a solvate, hydrate, or proadditive thereof, wherein moietie(s) $R^1$ is/are hydrocarbon groups and at least one of $R^1$ is selected from the group consisting of: —($C_1$-$C_{20}$)alkyl, —($C_1$-$C_{20}$)alkenyl, —($C_5$-$C_{20}$)cycloalkyl; R is selected from the group consisting of: —($C_4$-$C_{20}$)alkyl, —($C_4$-$C_{20}$)alkenyl, —($C_5$-$C_{20}$)cycloalkyl; X is O or S; $Y^1$ and $Y^2$ are independently selected from S and O; m is 1 or 2, n is 0 or 1, p is 1 or 2, with the proviso that m+n+p=3, and (ii) contacting the at least one phosphorus containing species with at least one amine having the formula VIII:

 VIII wherein $R^2$, $R^3$ and $R^4$ are independently selected from the group consisting of: —H, —($C_6$-$C_{36}$)alkyl, —($C_6$-$C_{36}$)alkenyl, —($C_6$-$C_{36}$)cycloalkyl, wherein at least one of $R^2$, $R^3$ and $R^4$ is not H; and wherein the reaction product prepared by the process provides at least 48 ppm of phosphorus based on the total weight of the lubricant composition and wherein the reaction product provides a molar ratio phosphorus to nitrogen (P/N) in the range of about 0.40 to about 1.50, and wherein both, the phosphorus containing species having the formula VII, and the amine having the formula VIII, may be a mixture of species according to its definition, respectively. In another embodiment, at least one amine having the formula VIII has $R^3$ and $R^4$ as H, and $R^2$ is selected from the group consisting of —($C_4$-$C_9$), —($C_{15}$-$C_{20}$)alkyl, and a mixture of both.

Lubricant compositions made using this process are useful for obtaining a friction durability greater than about 8,500 cycles using an amended JASO M 348:2002 test method where the μ0/μd value is maintained at less than about 1.1 and/or a minimum static friction of about 0.1 is maintained.

In one embodiment $R^1$ may not be —($C_4$-$C_5$)alkyl if both $Y^1$ and $Y^2$ are O.

In another embodiment the reaction product prepared by the process of contacting the phosphorus containing species having formula VII with the amine having the formula VIII may provide at least about 50, and in another embodiment at least about 200, and in another embodiment at least about 400, and in yet another embodiment at least about 1,000 ppm of phosphorus based on the total weight of the lubricant composition. In one embodiment the reaction product prepared by the process of contacting the phosphorus containing species having formula VII with the amine having the formula VIII may provide at least about 2,000, and in another embodiment at least about 2,500, and in yet another embodiment at least about 3,000, and in still another embodiment at least about 4,000 ppm of phosphorus based on the total weight of the lubricant composition. In another embodiment the reaction product prepared by the process of contacting the phosphorus containing species having formula VII with the amine having the formula VIII may provide less than about 10,000, and in another embodiment less than about 8,000, and in yet another embodiment less than about 5,000 ppm of phosphorus based on the total weight of the lubricant composition. By the above embodiments the friction durability and/or the minimum static friction of the lubricant composition may be further improved.

The transmission according to the invention comprises a wet-clutch friction disk and the lubricant composition. In one embodiment the transmission may be an automatic transmission. In another embodiment the transmission may comprise at least three wet-clutch friction disks. In yet another embodiment the wet-clutch friction disk may have a total intrusion volume of about 0.04 to about 0.1 ml/g of the sample and/or a pore diameter of maximum value of dV/dlogP measured in the range between about 0.1 and about 80 μm of about 6 to about 12 μm and/or a median diameter in the range of about 2 to about 20 μm. In still another embodiment the wet-clutch friction disk may have a total intrusion volume of about 0.06 to about 0.1 ml/g of the sample and/or a pore diameter of maximum value of dV/dlogP measured in the range between about 0.1 and about 80 μm of about 7 to about 10 μm and/or a median diameter in the range of about 5 to about 15 μm. The total intrusion volume and the pore diameter may be determined via mercury porosimetry. Each embodiment of the transmission may comprise a lubricant composition comprising any embodiment of the reaction product prepared by the process of contacting the phosphorus containing species having formula VII with the amine having the formula VIII.

In one embodiment of the process for preparing the lubricant composition the phosphorus containing species may have the formula IX:

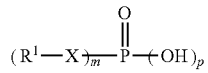

wherein moietie(s) $R^1$ is/are hydrocarbon group(s) and at least one of $R^1$ is selected from the group consisting of: linear —$(C_6-C_{20})$alkyl, —$(C_6-C_{20})$alkenyl, —$(C_6-C_{20})$cycloalkyl; X is O or S; m is 1 or 2; p is 1 or 2, with the proviso that m+p=3.

When the phosphorus containing species has the formula IX at least one, and in another embodiment two of $R^2$, $R^3$ and $R^4$ of the amine having the formula VIII may be branched, in particular branched —$(C_{11}-C_{14})$alkyl. Lubricant compositions having a reaction product made by this process are useful for providing a minimum static friction of 0.1. In another embodiment, at least one of moietie(s) $R^1$ of the compound of formula IX may not be branched. Lubricant compositions comprising a reaction product made by this process are useful for providing friction durability.

In one embodiment at least one of $R^1$ of the phosphorus containing species of formula IX may be a linear alkyl, in particular a linear —$(C_6-C_{18})$alkyl. In another embodiment at least one of $R^1$ may be n-hexyl. In another embodiment at least one of $R^1$ may be n-oleyl. Lubricant compositions comprising a reaction product made by this process are useful for providing friction durability and/or a minimum static friction for the lubricant composition.

When the phosphorus containing species has the formula IX $R^2$, $R^3$ and $R^4$ of the amine having the formula VIII may be independently selected from the group consisting of: —H, linear —$(C_{10}-C_{19})$alkyl, branched —$(C_6-C_{15})$alkyl, —$(C_6-C_{20})$alkenyl, —$(C_6-C_{20})$cycloalkyl. In another embodiment $R^2$, $R^3$ and $R^4$ may be independently selected from the group consisting of —H, linear —$(C_8-C_{18})$alkyl, branched —$(C_8-C_{14})$alkyl, —$(C_8-C_{18})$alkenyl, —(C8-C18) cycloalkyl. In yet another embodiment $R^2$, $R^3$ and $R^4$ are independently selected from the group consisting of —H, n-oleyl, 2-ethylhexyl, branched —$(C_{11}-C_{14})$alkyl. By the above embodiments the friction durability and/or the minimum static friction of the lubricant composition may be further improved.

In another embodiment the reaction product prepared by the process of contacting the phosphorus containing species having formula IX with the amine having the formula VIII may provide at least about 50, and in another embodiment at least about 200, and in another embodiment at least about 400, and in yet another embodiment at least about 1,000 ppm of phosphorus based on the total weight of the lubricant composition. In one embodiment the reaction product prepared by the process of contacting the phosphorus containing species having formula IX with the amine having the formula VIII may provide at least about 2,000, in another embodiment at least about 2,500, in another embodiment at least about 3,000, in yet another embodiment at least about 4,000 ppm of phosphorus based on the total weight of the lubricant composition. In another embodiment the reaction product prepared by the process of contacting the phosphorus containing species having formula IX with the amine having the formula VIII may provide less than about 10,000, in another embodiment less than about 8,000, and in another embodiment less than about 5,000 ppm of phosphorus based on the total weight of the lubricant composition. By the above embodiments the friction durability and/or the minimum static friction of the lubricant composition may be further improved.

The reaction product prepared by the process of contacting the phosphorus containing species having formula IX with the amine having the formula VIII may provide a molar ratio of phosphorus to nitrogen (P/N) of about 0.50 to about 0.90, and in another embodiment from about 0.52 to about 0.88. In one embodiment the reaction product prepared by the process of contacting the phosphorus containing species having formula IX with the amine having the formula VIII may provide a molar ratio of phosphorus to nitrogen (P/N) of about 0.61 to about 0.86. Accordingly, the friction durability and/or the minimum static friction of the lubricant composition may be further improved.

The transmission according to the invention comprises a wet-clutch friction disk and the lubricant composition. In one embodiment the transmission may be an automatic transmission. In another embodiment the transmission may comprise at least three wet-clutch friction disks. In yet another embodiment the wet-clutch friction disk may have a total intrusion volume of about 0.04 to about 0.1 ml/g of the sample and/or a pore diameter of maximum value of dV/dlogP measured in the range between about 0.1 and about 80 μm of about 6 to about 12 μm and/or a median diameter in the range of about 2 to about 20 μm. In still another embodiment the wet-clutch friction disk may have a total intrusion volume of about 0.06 to about 0.1 ml/g of the sample and/or a pore diameter of maximum value of dV/dlogP measured in the range between about 0.1 and about 80 μm of about 7 to about 10 μm and/or a median diameter in the range of about 5 to about 15 μm. The total intrusion volume and the pore diameter may be determined via mercury porosimetry. Each embodiment of the transmission may comprise a lubricant composition comprising any embodiment of the reaction product prepared by the process of contacting the phosphorus containing species having formula IX with the amine having the formula VIII.

In another embodiment of the process for preparing the lubricant composition the phosphorus containing species may have the formula X:

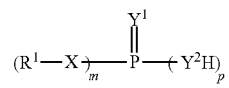

wherein moietie(s) $R^1$ is/are hydrocarbon group(s) and at least one of $R^1$ is selected from the group consisting of: —$(C_4-C_{20})$alkyl, —$(C_4-C_{20})$alkenyl, —$(C_5-C_{20})$cycloalkyl; $Y^1$ and $Y^2$ are different and selected from S and O; X is O or S; m is 1 or 2, p is 1 or 2, with the proviso that m+p=3.

The reaction product prepared by the process of contacting the phosphorus containing species having formula X with the amine having the formula VIII may provide a molar ratio phosphorus to nitrogen (P/N) of about 0.8 to about 1.5, and in another embodiment about 0.85 to about 1.30. Lubricant compositions comprising a reaction product prepared by this process are useful for improving friction durability.

In one embodiment at least one of $R^1$ of the phosphorus containing species having the formula X may be a linear alkyl, in particular a linear —$(C_4-C_{18})$alkyl. In another embodiment at least one of $R^1$ may be n-butyl.

When the phosphorus containing species has the formula X, $R^2$, $R^3$ and $R^4$ of the amine having formula VIII may be independently selected from the group consisting of: —H, —($C_8$-$C_{18}$)alkyl, —($C_8$-$C_{18}$)alkenyl, —($C_8$-$C_{18}$)cycloalkyl. In another embodiment $R^3$ and $R^4$ are —H, and $R^2$ is a —($C_4$-$C_9$)alkyl, or —($C_{15}$-$C_{20}$)alkyl, or a mixture of both. In yet another embodiment $R^2$ may be n-octyl, n-oleyl or a mixture of both.

In another embodiment the reaction product prepared by the process of contacting the phosphorus containing species having formula X with the amine having the formula VIII may provide at least about 100, in another embodiment at least about 400, in yet another embodiment at least about 800, and still in another embodiment at least about 1,000 ppm of phosphorus based on the total weight of the lubricant composition. In one embodiment the reaction product prepared by the process of contacting the phosphorus containing species having formula X with the amine having the formula VIII may provide at least about 2,000, in another embodiment at least about 2,500, and in yet another embodiment at least about 3,000, in still another embodiment at least about 4,000 ppm of phosphorus based on the total weight of the lubricant composition. In another embodiment the reaction product prepared by the process of contacting the phosphorus containing species having formula X with the amine having the formula VIII may provide less than about 10,000, and in another embodiment less than about 8,000, and in another embodiment less than about 5,000 ppm of phosphorus based on the total weight of the lubricant composition. By the above embodiments the friction durability and/or the minimum static friction of the lubricant composition may be further improved.

The transmission according to the invention comprises a wet-clutch friction disk and the lubricant composition. In one embodiment the transmission may be an automatic transmission. In another embodiment the transmission may comprise at least three wet-clutch friction disks. In yet another embodiment the wet-clutch friction disk may have a total intrusion volume of about 0.04 to about 0.1 ml/g of the sample and/or a pore diameter of maximum value of dV/dlogP measured in the range between about 0.1 and about 80 μm of about 6 to about 12 μm and/or a median diameter in the range of about 2 to about 20 μm. In still another embodiment the wet-clutch friction disk may have a total intrusion volume of about 0.06 to about 0.1 ml/g of the sample and/or a pore diameter of maximum value of dV/dlogP measured in the range between about 0.1 and about 80 μm of about 7 to about 10 μm and/or a median diameter in the range of about 5 to about 15 μm. The total intrusion volume and the pore diameter may be determined via mercury porosimetry. Each embodiment of the transmission may comprise a lubricant composition comprising any embodiment of the reaction product prepared by the process of contacting the phosphorus containing species having formula X with the amine having the formula VIII.

In another embodiment of the process for preparing the lubricant composition the phosphorus containing species may have the formula XI:

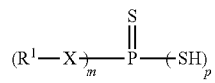

XI wherein moietie(s) $R_1$ is/are hydrocarbon group(s) and at least one of $R^1$ is selected from the group consisting of: —($C_4$-$C_{20}$)alkyl, —($C_4$-$C_{20}$)alkenyl, —($C_5$-$C_{20}$)cycloalkyl; X is O or S; m is 1 or 2, p is 1 or 2, with the proviso that m+p=3.

The reaction product prepared by the process of contacting the phosphorus containing species having formula XI with the amine having the formula VIII may provide a molar ratio of phosphorus to nitrogen (P/N) of about 0.8 to about 1.5, or in another embodiment from about 0.85 to about 1.30. Lubricant compositions comprising a reaction product made by this process are useful for improving friction durability.

At least one of $R^1$ of the phosphorus containing species having the formula IX may be a —($C_6$-$C_{10}$) alkyl. In another embodiment at least one of $R^1$ may be 2-ethylhexyl or n-hexyl.

When the phosphorus containing species has the formula XI $R^2$, $R^3$ and $R^4$ of the amine having the formula VIII may be independently selected from the group consisting of: —H, —($C_8$-$C_{18}$)alkyl, —($C_8$-$C_{18}$)alkenyl, —($C_8$-$C_{18}$) cycloalkyl. In another embodiment $R^3$ and $R^4$ may be —H, and $R^2$ may be a —($C_{11}$-$C_{14}$)alkyl, in particular a branched —($C_{11}$-$C_{14}$)alkyl.

In another embodiment the reaction product prepared by the process of contacting the phosphorus containing species having formula XI with the amine having the formula VIII may provide at least about 300, and in another embodiment at least about 1,000, and in yet another embodiment at least about 2,000, and in still another embodiment at least about 3,000 ppm of phosphorus based on the total weight of the lubricant composition. In one embodiment the reaction product prepared by the process of contacting the phosphorus containing species having formula XI with the amine having the formula VIII may provide at least about 4,000, and in another embodiment at least about 5,000, and in yet another embodiment at least about 6,000, and in still another embodiment at least about 7000 ppm of phosphorus based on the total weight of the lubricant composition. In another embodiment the reaction product prepared by the process of contacting the phosphorus containing species having formula XI with the amine having the formula VIII may provide less than about 15,000, and in another embodiment less than about 10,000, and yet in another embodiment less than about 9,000 ppm of phosphorus based on the total weight of the lubricant composition. By the above embodiments the friction durability and/or the minimum static friction of the lubricant composition may be further improved.

The transmission according to the invention comprises a wet-clutch friction disk and the lubricant composition. In one embodiment the transmission may be an automatic transmission. In another embodiment the transmission may comprise at least three wet-clutch friction disks. In yet another embodiment the wet-clutch friction disk may have a total intrusion volume of about 0.04 to about 0.1 ml/g of the sample and/or a pore diameter of maximum value of dV/dlogP measured in the range between about 0.1 and about 80 μm of about 6 to about 12 μm and/or a median diameter in the range of about 2 to about 20 μm. In still another embodiment the wet-clutch friction disk may have a total intrusion volume of about 0.06 to about 0.1 ml/g of the sample and/or a pore diameter of maximum value of dV/dlogP measured in the range between about 0.1 and about 80 μm of about 7 to about 10 μm and/or a median diameter in the range of about 5 to about 15 μm. The total intrusion volume and the pore diameter may be determined via mercury porosimetry. Each embodiment of the transmission may comprise a lubricant composition comprising any embodiment of the reaction product prepared by the process of contacting the phosphorus containing species having formula XI with the amine having the formula VIII.

In another embodiment of the process for preparing the lubricant composition the phosphorus containing species may have the formula XII:

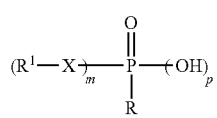

XII wherein moietie(s) $R^1$ is/are hydrocarbon groups and at least one of $R^1$ is selected from the group consisting of: —($C_1$-$C_{20}$)alkyl, —($C_1$-$C_{20}$)alkenyl, —($C_5$-$C_{20}$)cycloalkyl; R is selected from the group consisting of: —($C_4$-$C_{20}$)alkyl, —($C_4$-$C_{20}$)alkenyl, —($C_6$-$C_{20}$)cycloalkyl; X is O or S; m is 1, p is 1, with the proviso that m+p=2.

The reaction product prepared by the process of contacting the phosphorus containing species having formula XII with the amine having the formula VIII may provide a molar ratio of phosphorus to nitrogen (P/N) of about 0.5 to about 1.5, and in another embodiment about 0.7 to about 1.30. Lubricant compositions comprising a reaction product prepared by this process are useful for improving friction durability.

In one embodiment $R^1$ of the phosphorus containing species having the formula XII may be a —($C_6$-$C_{20}$) alkyl. In another embodiment $R^1$ may be octadecyl.

When the phosphorus containing species has the formula XII $R^2$, $R^3$ and $R^4$ of the amine having the formula VIII may be independently selected from the group consisting of: —H, —($C_1$-$C_{15}$)alkyl, —($C_1$-$C_{15}$)alkenyl, —($C_5$-$C_{15}$) cycloalkyl. In another embodiment $R^2$ may be methyl, $R^3$ may be a —($C_{11}$-$C_{14}$)alkyl, in particular a branched —($C_{11}$-$C_{14}$)alkyl and $R^4$ may be —H.

In another embodiment the reaction product prepared by the process of contacting the phosphorus containing species having formula XII with the amine having the formula VIII may provide at least about 50, and in another embodiment at least about 100, and in another embodiment at least about 200, and in yet another embodiment at least about 300 ppm of phosphorus based on the total weight of the lubricant composition. In one embodiment the reaction product prepared by the process of contacting the phosphorus containing species having formula XII with the amine having the formula VIII may provide at least about 500, in another embodiment at least about 600, in yet another embodiment at least about 700, and still in another embodiment at least about 1,000 ppm of phosphorus based on the total weight of the lubricant composition. In another embodiment the reaction product prepared by the process of contacting the phosphorus containing species having formula XII with the amine having the formula VIII may provide less than about 10,000, and in another embodiment less than about 8,000, and in yet another embodiment less than about 5,000 ppm of phosphorus based on the total weight of the lubricant composition. By the above embodiments the friction durability and/or the minimum static friction of the lubricant composition may be further improved.

The transmission according to the invention comprises a wet-clutch friction disk and the lubricant composition. In one embodiment the transmission may be an automatic transmission. In another embodiment the transmission may comprise at least three wet-clutch friction disks. In yet another embodiment the wet-clutch friction disk may have a total intrusion volume of about 0.04 to about 0.1 ml/g of the sample and/or a pore diameter of maximum value of dV/dlogP measured in the range between about 0.1 and about 80 μm of about 6 to about 12 μm and/or a median diameter in the range of about 2 to about 20 μm. In still another embodiment the wet-clutch friction disk may have a total intrusion volume of about 0.06 to about 0.1 ml/g of the sample and/or a pore diameter of maximum value of dV/dlogP measured in the range between about 0.1 and about 80 μm of about 7 to about 10 μm and/or a median diameter in the range of about 5 to about 15 μm. The total intrusion volume and the pore diameter may be determined via mercury porosimetry. Each embodiment of the transmission may comprise a lubricant composition comprising any embodiment of the reaction product prepared by the process of contacting the phosphorus containing species having formula XII with the amine having the formula VIII.

In one embodiment of the process for preparing a lubricant composition one or more of $R^2$, $R^3$ and $R^4$ is made by a process comprising oligomerizing a $C_2$-$C_6$ olefin, in one embodiment the amine of formula VIII

VIII is made by a process comprising oligomerizing a $C_2$-$C_6$ olefin to provide at least one, and in another embodiment at least two of $R_2$, $R_3$ and $R_4$ by amination using HCN and water under acidic conditions and in another embodiment the amine of formula VIII is made by a process comprising oligomerizing a C2-C6 olefin to provide at least one of $R^2$, $R^3$ and $R^4$, followed by reacting CO and $H_2$ to generate an alcohol and reacting the alcohol with $NH_3$ to generate the amine.

In an advantageous embodiment of the process for preparing the lubricant composition, the salting of the phosphorus containing species of formula VII, IX, X, XI, or XII with the amine of formula VIII is effected up to a degree of salting as expressed by the relation of value of index p (the acid valency as discussed above with respect to Formula I) and the relative molar amount of amine of formula VIII, q:p may be from about 0.85 to about 1.15 times the value of q, or in another embodiment from about 0.90 to about 1.10. If p equals q, one would speak of a stoichiometrically, or "neutral" amine salted acid phosphate.

In another embodiment of the process for preparing the lubricant, the phosphorus containing species of formulas VII, IX, X, XI, or XII has less than about 5.0 mole %, or in another embodiment less than about 4.0 mole % of phosphoric acid. In one embodiment the content of phosphoric acid is determined by P31 NMR using an internal standard and peak integration techniques.

The lubricant composition prepared by any of the above mentioned processes may comprise one or more friction modifiers selected from the group consisting of borated fatty epoxides, fatty epoxides, borated alkoxylated fatty amines, alkoxylated fatty amines, fatty amines, borated glycerol esters, polyol or glycerol esters, metal salts of fatty acids, fatty acid amides, fatty imidazolines, condensation products of carboxylic acids and polyalkylene-polyamines, sulfurized olefins, amine salts of partial esters of phosphoric acids, dialkyl phosphites, metal salts of alkyl salicylates, esters of long chain alkyl phosphonates, long chain amino ethers and alkyoxylated versions thereof, long chain alkyoxylated alcohol, organo molybdenum compounds, or mixtures thereof.

One class of friction modifiers may be succinimides, amines, secondary amines, tertiary amines, imidazolines and borated epoxides. Another class of friction modifiers may be borated glycerol esters, polyol or glycerol esters, metal salts of fatty acids, fatty acid amides, sulfurized olefins, dialkyl phosphites, metal salts of alkyl salicylate, esters of long chain alkylphosphonates, long chain alkyoxylated alcohols and organo molybdenum compounds.

In an advantageous embodiment the lubricant composition prepared by any of the above mentioned processes may have a friction durability greater than about 8,500 and in another embodiment greater than about 10,000 and in another embodiment greater than about 20,000 cycles using an amended JASO M348:2002 test method where the μ0/μd value is maintained at less than about 1.1, and/or a minimum static friction of about 0.1 is maintained.

EXAMPLES

The inventors have prepared a series of working examples E1 to E4 and comparative examples C1 and C2 as listed in table 1 below. All working and all comparative examples are lubricant compositions comprising a compound of formulae II to V and a base formulation, respectively. The base formulations are further specified in table 2 below. The working examples and the comparative examples are additionally specified as follows:

Working Example 1 (E1)

The compound of formula II wherein $R^1$ is n-hexyl, $R^2$ is branched —$(C_{11}-C_{14})$alkyl, $R^3$ is branched —$(C_{11}-C_{14})$alkyl, $R^4$ is H and X is O applied to base formulation 1.

Working Example 2 (E2)

The compound of formula III wherein $R^1$ is n-butyl, $R^2$ is either oleyl or n-octyl, $R^3$ and $R^4$ are H, $Y^1$ is S, $Y^2$ is O and X is O applied to base formulation 1.

Working Example 3 (E3)

The compound of formula IV wherein $R^1$ is n-hexyl, $R^2$ is branched —$(C_{11}-C_{14})$alkyl, $R^3$ is branched —$(C_{11}-C_{14})$alkyl, $R^4$ is H and X is O applied to base formulation 2.

Working Example 4 (E4)

The compound of formula V wherein R is octadecyl, $R^1$ is methyl $R^2$ is branched —$(C_{11}-C_{13})$alkyl, $R^3$ and $R^4$ are H and X is O applied to base formulation 2.

Comparative Example (C1)

The compound of formula II wherein $R^1$ is n-hexyl, $R^2$ is branched —$(C_{11}-C_{14})$alkyl, $R^3$ is branched —$(C_{11}-C_{14})$alkyl, $R^4$ is H and X is O applied to base formulation 1.

Comparative Example (C2)

The compound of formula III wherein $R^1$ is n-butyl, $R^2$ is branched —$(C_{11}-C_{13})$alkyl, $R^3$ and $R^4$ are H, $Y^1$ is S, $Y^2$ is O and X is O applied to base formulation 2.

TABLE 1

| | Treat Rate in wt-% | P in ppm | N in ppm | P/N | Friction Durability in Cycles | Minimum Static Friction |
|---|---|---|---|---|---|---|
| E1 | 5.00 | 2045 | 1168 | 0.79 | >20 000 | 0.107 |
| E2 | 1.87 | 1152 | 589 | 0.88 | >20 000 | 0.052 |
| E3 | 11.086 | 5110 | 2310 | 1.0 | >10 000 | 0.099 |
| E4 | 0.1035 | 51.2 | 28.0 | 0.83 | >10 000 | 0.135 |
| C1 | 0.05 | 20.5 | 11.7 | 0.86 | 4750 | 0.138 |
| C2 | 0.8 | 628 | 170 | 1.67 | 2000 | 0.148 |

The treat rates listed in table 1 refer to the amount of the compounds of formulae II to V in wt. % based on the total weight of the lubricant composition, respectively. P in ppm refers to the amount of phosphorus provided by the compounds of formulae II to V based on the total weight of the lubricant composition, respectively. The amount of phosphorus was measured via ICP-OES. N in ppm refers to the amount of nitrogen provided by the compounds of formulae II to V based on the total weight of the lubricant composition, respectively. The amount of nitrogen was measured according to ASTM Test Method D5291-10, Test method D. P/N refers to the molar ratio of phosphorus to nitrogen provided by the compounds of formulae II to V, respectively.

The friction durability as well as the minimum static friction in table 1 was determined in accordance with JASO M348:2002 "Friction Characteristics Test Method for Automatic Transmission Fluids" using an SAE No. 2 test machine with the exceptions listed below under "Test Conditions." This amended test method is referred to throughout the specification as "the amended JASO M348:2002 test method." These amended conditions were selected to evaluate the durability of the shifting properties of a clutch.

Test Conditions

Cycles: Each test was run until the μ0/μd value was greater than 1.1 or to 10,000 cycles or 20,000 cycles depending on the individual test.

Clutch Plate Arrangement: S-F-S-F-S-F-S, wherein S is a standard steel plate according to JASO M348:2002, and F is a paper friction disk in standard JASO size. The friction disc has a total intrusion volume of 0.070 ml/g of the sample (plate+friction material) and a pore diameter of maximum value of dV/dlogP measured in the range between 0.1 and 80 μm of 4.734 μm. The total intrusion volume as well as the pore diameter of maximum value of dV/dlogP was determined via mercury intrusion porosimetry according to ASTM Test No. D 4284-03. A mercury pore distribution was measured using a Porous Materials, Inc., Mercury Intrusion Porosimeter Model AMP-60K-A-1 (Porous Materials, Inc., Ithaca, N.Y., USA). Because triple distilled mercury was employed, surface tension used in the calculation was 480 dynes per centimeter. The contact angle was 140 degrees.

TABLE 2

| | Base formulation 1 | Base formulation 2 |
|---|---|---|
| Organo-modified polydimethylsiloxane | 0.004 | 0.004 |
| Nonylated diphenylamine | 0.4 | 0.4 |
| Polyacrylate | 0.01 | 0.01 |
| Overbased calcium sulfonate detergent (300 TBN) | 0.2 | 0.2 |
| Polymethacrylate viscosity index improver | 5.3 | 5.3 |
| Boronated/phosphorylated succinimide dispersant | 5 | 5 |
| Thiadiazole | 0.135 | 0.135 |

TABLE 2-continued

| | Base formulation 1 | Base formulation 2 |
|---|---|---|
| N-oleyl-1,3-diaminopropane | 0.008 | |
| Polydimethylsiloxane | 0.04 | 0.04 |
| Dimethyl Stearamine | 0.055 | |
| 6 cSt mineral base oil | 35 | 35 |
| 2 cSt base oil | 1.198 | 1.198 |
| 3 cSt base oil | Balance | Balance |
| Total | 100 | 100 |

The amounts of the ingredients of the base formulations 1 and 2 are given in wt.-%, respectively.

The examples show that at high treat rates of phosphorus containing species salted with amine (Formulae II to V) superior friction durability may be achieved, provided the P/N ratio is kept within the boundaries of the invention. In a second aspect, the invention provides lubricant compositions that exhibit a high static friction.

The invention claimed is:

1. A transmission fluid comprising a lubricant composition which is a mixture of:
   (a) a major amount of lubricating oil; and
   (b) a compound having a phosphorus containing species and an amine having the formula I:

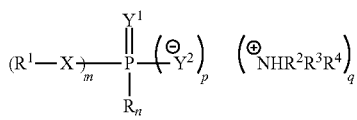

or a solvate, hydrate, or proadditive thereof,
   wherein moietie(s) $R^1$ is/are hydrocarbon groups and at least one of $R^1$ is selected from the group consisting of: —($C_1$-$C_{20}$)alkyl and —($C_1$-$C_{20}$)alkenyl; R is selected from the group consisting of: —($C_4$-$C_{20}$)alkyl and —($C_4$-$C_{20}$)alkenyl; and wherein $R^2$, $R^3$ and $R^4$ are independently selected from the group consisting of: —H, linear —($C_{10}$-$C_{19}$) alkyl, branched —($C_6$-$C_{15}$) alkyl, —($C_6$-$C_{20}$) alkenyl, —($C_6$-$C_{20}$) cycloalkyl, wherein at least one of $R^2$, $R^3$ and $R^4$ is not H and contains 8 to 18 carbon atoms; X is O; $Y^1$ and $Y^2$ are independently selected from S and O provided that $Y^1$ and $Y^2$ are not both S; m is 1 or 2, n is 0 or 1, p is 1 or 2, with the proviso that m+n+p=3 and q=0.8 to 1.2*p, wherein the compound of formula I provides at least 50 ppm of phosphorus based on the total weight of the lubricant composition and wherein the compound of formula I provides a molar ratio phosphorus to nitrogen (P/N) in the range of from about 0.50 to less than 1.0.

2. The transmission fluid according to claim 1, wherein the compound having a phosphorus containing species and an amine has the formula II:

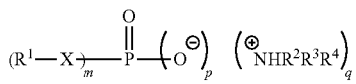

or a solvate, hydrate, or proadditive thereof,
   wherein moietie(s) $R^1$ is/are hydrocarbon group(s) and at least one of $R^1$ is selected from the group consisting of: linear —($C_6$-$C_{20}$)alkyl and —($C_6$-$C_{20}$)alkenyl; and wherein $R^2$, $R^3$ and $R^4$ are independently selected from the group consisting of: —H, linear —($C_{10}$-$C_{19}$) alkyl, branched —($C_6$-$C_{15}$) alkyl, —($C_6$-$C_{20}$) alkenyl, —($C_6$-$C_{20}$) cycloalkyl, wherein at least one of $R^2$, $R^3$ and $R^4$ is not H and contains 8 to 18 carbon atoms; X is O; m is 1 or 2; p is 1 or 2, with the proviso that m+p=3 and q=0.8 to 1.2*p.

3. The transmission fluid according to claim 2 wherein at least one of $R^2$, $R^3$ and $R^4$ is a branched —($C_{11}$-$C_{14}$) alkyl group.

4. The transmission fluid according to claim 3 wherein at least one of moietie(s) $R^1$ is not a branched hydrocarbyl group.

5. The transmission fluid of claim 4, wherein the compound of formula II provides a molar ratio of phosphorus to nitrogen (P/N) of from about 0.50 to about 0.90.

6. The transmission fluid according to claim 1, wherein the compound having a phosphorus containing species and an amine has the formula III:

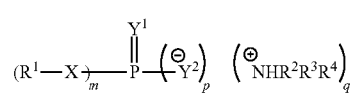

or a solvate, hydrate, or proadditive thereof,
   wherein moietie(s) $R^1$ is/are hydrocarbon group(s) and at least one of $R^1$ is selected from the group consisting of: —($C_4$-$C_{20}$)alkyl and —($C_4$-$C_{20}$)alkenyl; and wherein $R^2$, $R^3$ and $R^4$ are independently selected from the group consisting of: —H, linear —($C_{10}$-$C_{19}$) alkyl, branched —($C_6$-$C_{15}$) alkyl, —($C_6$-$C_{20}$) alkenyl, —($C_6$-$C_{20}$) cycloalkyl, wherein at least one of $R^2$, $R^3$ and $R^4$ has 8 to 18 carbon atoms; X is O, $Y^1$ and $Y^2$ are independently selected from S and O provided that $Y^1$ and $Y^2$ are not both S; m is 1 or 2, p is 1 or 2, with the proviso that m+p=3 and q=0.8 to 1.2*p.

7. The transmission fluid according to claim 6, wherein the compound of formula III provides a molar ratio of phosphorus to nitrogen (P/N) of from about 0.80 to about 0.90.

8. The transmission fluid according to claim 7, wherein $R^3$ and $R^4$ are —H, and $R^2$ is selected from the group consisting —($C_6$-$C_9$) alkyl, —($C_{15}$-$C_{20}$) alkyl, and a mixture of both.

9. The transmission fluid according to claim 8, wherein the compound of formula III provides at least about 100 ppm of phosphorus based on the total weight of the lubricant composition.

10. The transmission fluid according to claim 1, wherein the compound having a phosphorus containing species and an amine has the formula V:

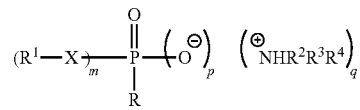

wherein $R^1$ is selected from the group consisting of: —($C_1$-$C_{20}$)alkyl and —($C_1$-$C_{20}$)alkenyl; R is selected from the group consisting of: —($C_4$-$C_{20}$)alkyl, and —($C_4$-$C_{20}$)alkenyl; and wherein $R^2$, $R^3$ and $R^4$ are independently selected from the group consisting of: —H, linear —($C_{10}$-$C_{19}$) alkyl, branched —($C_6$-$C_{15}$) alkyl, —($C_6$-$C_{20}$) alkenyl, —($C_6$-$C_{20}$) cycloalkyl, wherein at least one of $R^2$, $R^3$ and $R^4$ is not H and contains 8 to 18 carbon atoms; X is O; m is 1, p is 1 and q=0.8 to 1.2*p.

11. The transmission fluid according to claim 1, wherein said one or more of $R^2$, $R^3$ and $R^4$ is made by a process of oligomerizing a $C_2$-$C_6$ olefin, in particular wherein the amine

is made by a process comprising oligomerizing a $C_2$-$C_6$ olefin to provide at least one of $R^2$, $R^3$ and $R^4$ by amination using HCN and water under acidic conditions or alternatively the amine is made by oligomerizing a $C_2$-$C_6$ olefin to provide at least one of $R^2$, $R^3$ and $R^4$, followed by reacting CO and $H_2$ to generate an alcohol and reacting the alcohol with $NH_3$ to generate the amine.

12. The transmission fluid of claim 1, wherein the ratio of molar equivalents of amine to phosphorus containing species is from about 0.8 to about 1.2.

13. The transmission fluid of claim 1, wherein the lubricant composition has a friction durability greater than about 8,500 cycles using an amended JASO M348:2002 test method, where the µ0/µd value is maintained at less than about 1.1, and a minimum static friction of about 0.1 is maintained.

14. A Process for preparing a transmission fluid comprising a lubricant composition, said process comprising mixing
(a) a major amount of lubricating oil; and
(b) a reaction product prepared by a process comprising the steps of:
(i) providing at least one phosphorus containing species having the formula VII:

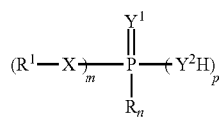

VII or a solvate, hydrate, or proadditive thereof,
wherein moietie(s) $R^1$ is/are hydrocarbon groups and at least one of $R^1$ is selected from the group consisting of: —($C_1$-$C_{20}$)alkyl, —($C_1$-$C_{20}$)alkenyl, —($C_5$-$C_{20}$) cycloalkyl; R is selected from the group consisting of: —($C_4$-$C_{20}$)alkyl, —($C_4$-$C_{20}$)alkenyl, —($C_5$-$C_{20}$) cycloalkyl; X is O; $Y^1$ and $Y^2$ are independently selected from S and O provided that $Y^1$ and $Y^2$ are not both S; m is 1 or 2, n is 0 or 1, p is 1 or 2, with the proviso that m n p=3, and
(ii) contacting the at least one phosphorus containing species with at least one amine having the formula VIII:

 VIII wherein $R^2$, $R^3$ and $R^4$ are independently selected from the group consisting of: —H, linear —($C_{10}$-$C_{19}$) alkyl, branched —($C_6$-$C_{15}$) alkyl, —($C_6$-$C_{20}$) alkenyl, —($C_6$-$C_{20}$) cycloalkyl, wherein at least one of $R^2$, $R^3$ and $R^4$ is not H; and
wherein the reaction product prepared by the process provides at least 50 ppm of phosphorus based on the total weight of the lubricant composition and wherein the reaction product provides a molar ratio of phosphorus to nitrogen (P/N) in the range of from about 0.50 to less than 1.0, and wherein both, the phosphorus containing species having the formula VII, and the amine having the formula VIII, may be a mixture of species according to its definition, respectively.

15. The process according to claim 14, wherein the phosphorus containing species has the formula IX:

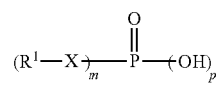

IX wherein moietie(s) $R^1$ is/are hydrocarbon group(s) and at least one of $R^1$ is selected from the group consisting of: linear —($C_6$-$C_{20}$)alkyl, —($C_6$-$C_{20}$)alkenyl, —($C_6$-$C_{20}$) cycloalkyl; X is O or S; m is 1 or 2; p is 1 or 2, with the proviso that m+p=3.

16. The process according to claim 15, wherein the at least one amine having the formula VIII wherein at least one of $R^2$, $R^3$ and $R^4$ is a branched —($C_{11}$-$C_{14}$) alkyl group.

17. The process according to claim 15, wherein the phosphorus containing species has the formula X:

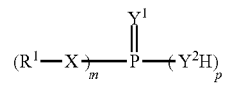

X wherein moietie(s) $R^1$ is/are hydrocarbon group(s) and at least one of $R^1$ is selected from the group consisting of: —($C_4$-$C_{20}$)alkyl, —($C_4$-$C_{20}$)alkenyl, —($C_5$-$C_{20}$)cycloalkyl; $Y^1$ and $Y^2$ are different and selected from S and O with the proviso that $Y^1$ and $Y^2$ are not both S; X is O; m is 1 or 2, p is 1 or 2, with the proviso that m+p=3.

18. The process according to claim 17, wherein the at least one amine having the formula VIII has $R^3$ and $R^4$ as H, and $R^2$ is selected from the group consisting of —($C_4$-$C_9$), —($C_{15}$-$C_{20}$)alkyl, and a mixture of both.

19. The process according to claim 15, wherein the phosphorus containing species has the formula XII:

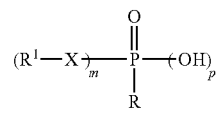

XII wherein moietie(s) $R^1$ is/are hydrocarbon groups and at least one of $R^1$ is selected from the group consisting of: —($C_1$-$C_{20}$)alkyl, —($C_1$-$C_{20}$)alkenyl, —($C_5$-$C_{20}$)cycloalkyl; R is selected from the group consisting of: —($C_4$-$C_{20}$)alkyl, —($C_4$-$C_{20}$)alkenyl, —($C_6$-$C_{20}$)cycloalkyl; X is O; m is 1, p is 1.

20. The process according to claim 15, wherein said one or more of $R^2$, $R^3$ and $R^4$ is made by a process comprising oligomerizing a $C_2$-$C_6$ olefin, in particular wherein the amine of formula VIII $$NR^2R^3R^4 \qquad\qquad VIII$$

is made by a process comprising oligomerizing a $C_2$-$C_6$ olefin to provide at least one, or at least two of $R_2$, $R_3$ and $R_4$ by amination using HCN and water under acidic conditions or alternatively the amine is made by a process comprising oligomerizing a $C_2$-$C_6$ olefin to provide at least one of $R^2$, $R^3$ and $R^4$, followed by reacting CO and $H_2$ to generate an alcohol and reacting the alcohol with $NH_3$ to generate the amine.

21. The process of claim 15, wherein the ratio of molar equivalents of amine to phosphorus containing species in the reaction product is from about 0.8 to about 1.2.

22. The process of claim 15, wherein the reaction product has less than about 5.0 mole phosphoric acid.

23. A transmission fluid comprising a lubricant composition, wherein said lubricant composition is prepared by a process comprising mixing
(a) a major amount of lubricating oil; and
(b) a reaction product prepared by a process comprising the steps of:
(i) providing at least one phosphorus containing species having the formula VII:

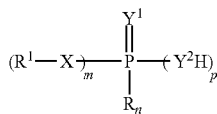

VII or a solvate, hydrate, or proadditive thereof,
wherein moietie(s) $R^1$ is/are hydrocarbon groups and at least one of $R^1$ is selected from the group consisting of: —($C_1$-$C_{20}$)alkyl, —($C_1$-$C_{20}$)alkenyl, —($C_5$-$C_{20}$)cycloalkyl; R is selected from the group consisting of: —($C_4$-$C_{20}$)alkyl, —($C_4$-$C_{20}$)alkenyl, —($C_5$-$C_{20}$)cycloalkyl; X is O; $Y^1$ and $Y^2$ are independently selected from S and O provided that $Y^1$ and $Y^2$ are not both S; m is 1 or 2, n is 0 or 1, p is 1 or 2, with the proviso that m+n+p=3, and
(ii) contacting the at least one phosphorus containing species with at least one amine having the formula VIII:

$$NR^2R^3R^4 \qquad\qquad VIII$$

wherein $R^2$, $R^3$ and $R^4$ are independently selected from the group consisting of: —H, linear —($C_{10}$-$C_{19}$) alkyl, branched —($C_6$-$C_{15}$) alkyl, —($C_6$-$C_{20}$) alkenyl, —($C_6$-$C_{20}$) cycloalkyl, wherein at least one of $R^2$, $R^3$ and $R^4$ is not H; and
wherein the reaction product prepared by the process provides at least 48-50 ppm of phosphorus based on the total weight of the lubricant composition and wherein the reaction product provides a molar ratio of phosphorus to nitrogen (P/N) in the range of from about 0.50 to less than 1.0, and wherein both, the phosphorus containing species having the formula VII, and the amine having the formula VIII, may be a mixture of species according to its definition, respectively.

24. The transmission fluid according to claim 23, wherein the reaction product provides at least about 400 ppm of phosphorus based on the total weight of the lubricant composition.

25. The transmission fluid of claim 23, wherein the lubricant composition has a friction durability greater than about 8,500 cycles using an amended JASO M348:2002 test method where the μ0/μd value is maintained at less than about 1.1, and a minimum static friction of about 0.1 is maintained.

26. An automatic transmission comprising at least three wet-clutch friction disk and a lubricant composition comprising a mixture of:
(a) a major amount of lubricating oil; and
(b) a compound having a phosphorus containing species and an amine having the formula I:

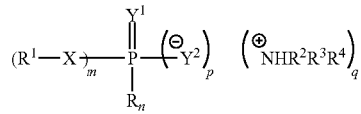

I or a solvate, hydrate, or proadditive thereof,
wherein moietie(s) R1 is/are hydrocarbon groups and at least one of R1 is selected from the group consisting of: —($C_1$-$C_{20}$)alkyl, —($C_1$-$C_{20}$)alkenyl, —($C_5$-$C_{20}$)cycloalkyl; R is selected from the group consisting of: —($C_4$-$C_{20}$)alkyl, —($C_4$-$C_{20}$)alkenyl, —($C_5$-$C_{20}$)cycloalkyl; and wherein $R^2$, $R^3$ and $R^4$ are independently selected from the group consisting of: —H, linear —($C_{10}$-$C_{19}$) alkyl, branched —($C_6$-$C_{15}$) alkyl, —($C_6$-$C_{20}$) alkenyl, —($C_6$-$C_{20}$) cycloalkyl, wherein at least one of $R^2$, $R^3$ and $R^4$ is not H; X is O; $Y^1$ and $Y^2$ are independently selected from S and O provided that $Y^1$ and $Y^2$ are not both S; m is 1 or 2, n is 0 or 1, p is 1 or 2, with the proviso that m+n+p=3 and q=0.8 to 1.2*p,
wherein the compound of formula I provides at least 50 ppm of phosphorus based on the total weight of the lubricant composition and wherein the compound of formula I provides a molar ratio phosphorus to nitrogen (P/N) in the range of from about 0.50 to less than 1.0.

* * * * *